United States Patent [19]

Dattilo

[11] 3,921,881

[45] Nov. 25, 1975

[54] TWO PIECE SHEET METAL CAPSTAN HOUSING ASSEMBLY

[75] Inventor: Donald J. Dattilo, Mount Prospect, Ill.

[73] Assignee: Motorola, Inc., Chicago, Ill.

[22] Filed: May 13, 1974

[21] Appl. No.: 469,203

[52] U.S. Cl. .................................. 226/194; 226/194

[51] Int. Cl.$^2$ .......................................... B65H 17/20

[58] Field of Search ....... 226/194, 89, 90, 181, 186, 226/187; 242/194, 197, 198, 206; 360/92, 93, 94

[56] References Cited

UNITED STATES PATENTS 3,462,057 8/1969 Yamamoto ..................... 226/194 X 3,814,300 6/1974 Fukayama........................... 226/194

*Primary Examiner*—Richard A. Schacher

*Attorney, Agent, or Firm*—James W. Gillman; Donald J. Lisa

[57] ABSTRACT

A capstan housing assembly in a tape player device using an exchangeable cartridge includes a chassis having a cartridge support member having a support wall and first and second sidewalls, and a support plate precisely positioned with respect to the cartridge support member to define a cartridge receiving chamber. The support wall of the cartridge support member includes an opening therein adapted to receive a lower capstan bearing and the support plate includes an opening therein adapted to receive an upper capstan bearing. The support plate is mounted on the cartridge support member such that the lower and upper capstan bearings support and hold the capstan shaft in a predetermined position with respect to the cartridge receiving chamber.

6 Claims, 3 Drawing Figures

TWO PIECE SHEET METAL CAPSTAN HOUSING ASSEMBLY

BACKGROUND OF THE INVENTION

In the past, magnetic tape player devices have utilized either a die cast capstan housing assembly attached to the bottom plate and the top plate of the cartridge receiving chamber, or a capstan bearing positioned and held in the bottom plate of the cartridge receiving chamber and a capstan bracket mounted to the bottom plate of the cartridge receiving chamber to support the upper capstan bearing to hold the capstan in vertical alignment with the inserted exchangeable cartridge. Such capstan housing assemblies require precise alignment during the mounting of the capstan housing and introduce mechanical factors such as poor capstan vertical alignment with the inserted tape cartridge. Additionally, such capstan housings have resulted in tape player devices that are bulky in construction and complex and costly to manufacture.

SUMMARY OF THE INVENTION

An object of this invention is to provide an improved chassis and capstan support assembly for a cartridge tape player device.

Another object of this invention is to provide an improved capstan housing assembly which eliminates the necessity of using a die cast or bracketed capstan housing assembly in a tape player device.

It is a further object of this invention to provide a two piece sheet metal capstan housing assembly in a tape player device.

A still further object of this invention is to provide an improved tape drive mechanism wherein the capstan housing includes capstan bearings precisely positioned in the top and bottom plates of the cartridge receiving chamber.

Briefly, the capstan housing assembly of the present invention is utilized in the tape player device adapted to receive and play a magnetic tape cartridge. A cartridge support member, having a support wall and first and second sidewalls spaced apart and integrally formed with the first wall, includes an opening therein adapted to receive a lower capstan bearing. The first and second sidewalls have flanged portions integrally formed thereto and extending outwardly in a plane perpendicular to the plane of the sidewalls. A support plate having an opening therein adapted to receive an upper capstan bearing is precisely positioned with respect to the lower capstan bearing in said cartridge support member. The cartridge support member and the support plate are mounted together by connecting the support plate to the flanged portions of the first and second sidewalls to define the cartridge receiving chamber. A capstan shaft is supported and held by the upper and lower capstan bearings in a predetermined position with respect to the cartridge receiving chamber.

DETAILED DESCRIPTION

Figures 1, 2, 3:
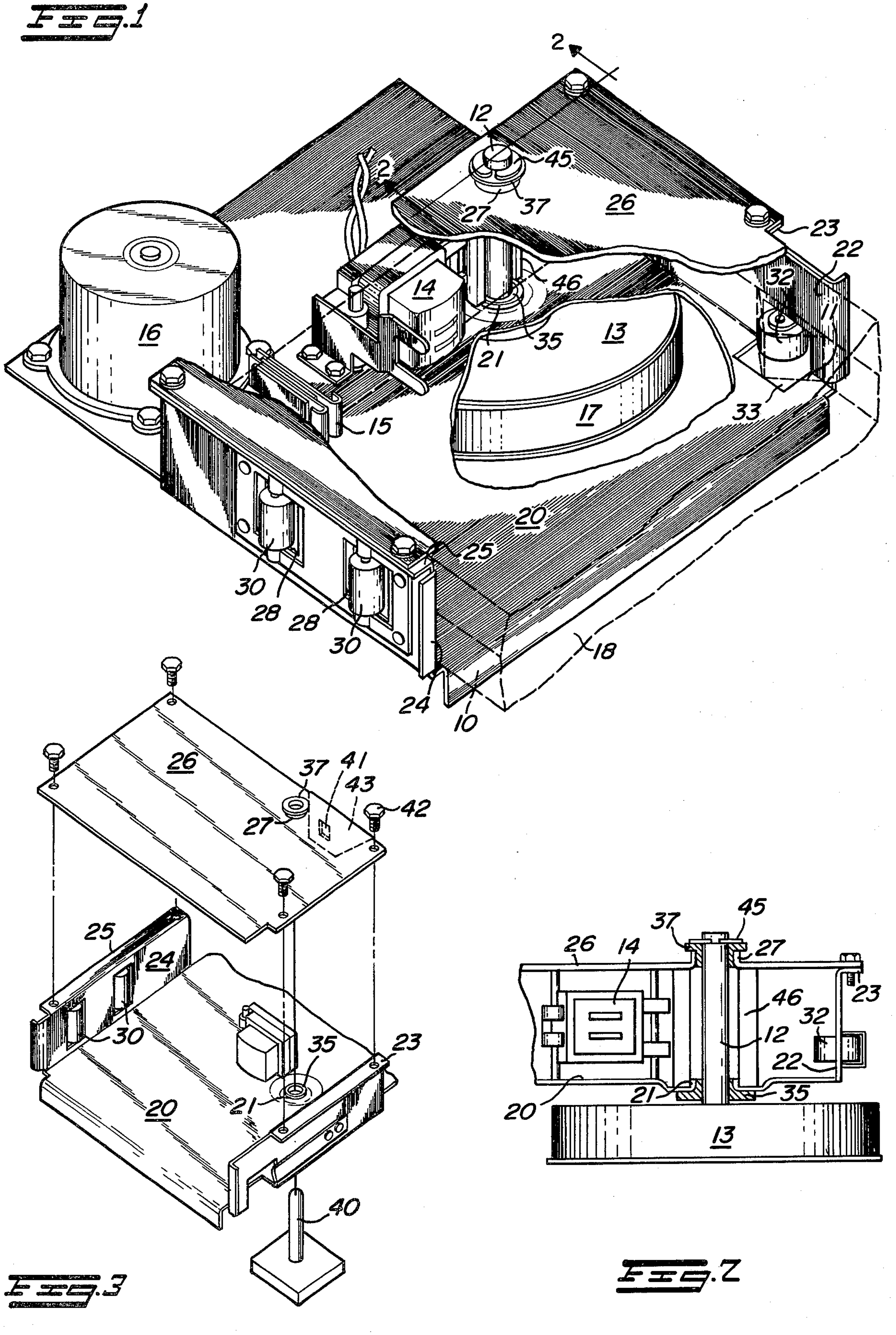
FIG. 1 is a perspective view of a tape player device utilizing the sheet metal capstan housing assembly of the present invention.
FIG. 2 is a cross-sectional view taken through the capstan shaft along the line A-A of FIG. 1 showing the sheet metal capstan housing assembly of the instant invention.
FIG. 3 is a perspective exploded view showing the assembly of the present invention.

Referring now to the drawings, in which like reference numerals are used throughout the several views to identify the same parts, FIGS. 1 and 2 show a portion of a tape player device which is adapted to receive and play an exchangeable tape cartridge 10, shown in dotted lines, having a V-shaped notch 11 formed on the side thereof and having a multi-track tape therein. The cartridge 10 is positioned within the tape player device to cause a cartridge pressure roller within the cartridge to be engaged by the capstan shaft 12 to drive the tape through the cartridge 10. A magnetic tape transducer head 14 is engageable with the magnetic tape and cooperates therewith. Whenever one of a plurality of sets of tracks on the magnetic tape is completed, a conductive strip on the magnetic tape bridges contacts 15 to energize a mechanism, as is well-known in the art, to position the transducer head 14 to the next tracks on the magnetic tape. Rotatably mounted to the capstan shaft 12 is a flywheel 13 which is operatively connected to the tape drive motor 16 by drive belt 17 to drive the capstan shaft at a predetermined speed.

A cartridge receiving chamber 18 is formed within the tape player device by a sheet metal chassis which forms a cartridge support member 20 and first and second sidewalls 22 and 24, respectively, and by a cover or support plate 26 precisely positioned with respect to the cartridge support member 20. The first and second sidewalls 22 and 24 are spaced apart and integrally formed with the support member 20 and include flange portions 23 and 25 respectively, integrally formed thereto and extending outwardly therefrom in a plane perpendicular to the plane of the first and second sidewalls 22 and 24. Mounted in apertures 28 on the second sidewall 24 are guides or rollers 30 which provide a low friction surface to engage the corresponding sidewall of cartridge 10 as it is inserted into the cartridge receiving chamber 18. The locking mechanism for the cartridge 10 includes a retention element or roller 32 which is biased through an opening 33 in sidewall 22 to engage notch 11 of cartridge 10 to hold the cartridge in playing position. In the playing position, the cartridge is aligned with and cooperates with the transducer head 14 and a pinch roller within the cartridge (not shown) to hold the tape against the capstan shaft 12 to drive the tape at a predetermined speed.

The support member 20 includes an opening 21 (FIG. 2) therein into which is seated a lower capstan shaft bearing 35. The opening 21 is predeterminedly positioned with respect to opening 33 in sidewall 22 and provides a precise location for the capstan shaft bearing 35 with respect to the locking means for holding the cartridge 10 in playing position. The support plate 26 includes an opening 27 therein into which is seated an upper capstan shaft bearing 37.

FIG. 3 illustrates the alignment and mounting together of the support plate 26 with the cartridge support member 20 to form the two piece sheet metal capstan housing assembly of the instant invention. With the support member 20 and plate 26 being aligned, the lower capstan shaft bearing 35 is seated in opening 21 of support member 20, a projection or master shaft 40, having the same dimension as the capstan shaft 12 is inserted and extends through the lower capstan shaft bearing 35. The seated upper capstan bearing 37 and support plate 26 are positioned on master shaft 40 such that the master shaft 40 extends therethrough, thereby vertically aligning the lower and upper capstan shaft bearings with respect to each other. When this alignment has been accomplished, the support plate 26 is positioned onto flange portions 23 and 25 of first and second sidewalls 22 and 24, respectively, and permanently attached or fastened thereto. As disclosed in FIG. 3, this attachment may be accomplished by fasteners 42 extending through openings 44 and 46 in support plate 26 and flange portions 23 and 25, respectively. Other means of attachment may include riveting or spot welding and are intended to be included within the description of the invention. When the support plate 26 and cartridge support member 19 have been aligned and attached together, the resultant sheet metal chassis structure defines the cartridge receiving chamber 18. By permanently attaching the support plate 26 to the cartridge support member 20, the capstan housing assembly including the capstan shaft bearings 35 and 37 is complete, and the location of the capstan housing with respect to the cartridge receiving chamber 18 is accurately determined.

Additionally, support plate 26 may include a flange portion 43 having an opening 41 therein, which flange portion is positioned adjacent opening 27. Flange 27 provides a mounting for a stripper assembly 46 (FIG. 2) and holds the stripper assembly 46 adjacent the capstan shaft 12 rotatably journaled in the capstan shaft bearings 35 and 37. The stripper assembly prevents the magnetic tape in cartridge 10 from wrapping around the capstan shaft 12 during engagement of the capstan shaft with the magnetic tape.

FIG. 2 illustrates the mounting of the capstan shaft 12 in the two piece sheet metal capstan housing assembly of the instant invention. The capstan shaft 12 is rotatably journaled in the lower capstan shaft bearing 35 and in the upper capstan shaft bearing 37. A C-washer 45 is inserted over the capstan shaft 12 above the upper capstan bearing 37, and a flywheel 13 is rotatably mounted to the capstan shaft below the lower capstan bearing 35. The flywheel is operatively connected to the tape drive motor 16 (FIG. 1) to drive the capstan shaft at a predetermined speed.

It is apparent from the foregoing disclosure that the capstan bearing structure and housing assembly described results in the construction and design of a tape player device requiring less space and fewer parts than the prior art devices. Such a construction results also in a tape player device that is lighter in weight than the prior art devices because of the elimination of die cast capstan housings or heavy bracketed capstan housings.

I claim:

1. A capstan housing assembly in a tape player device of the type using an exchangeable cartridge including in combination:

a capstan shaft, first and second capstan bearings for supporting said capstan shaft, a cartridge support member having a support wall and a first and second sidewalls spaced apart and integrally formed with said support wall to define a cartridge receiving chamber, said support wall having an opening therein adapted to receive said first capstan bearing, and said first and second sidewalls having flange portions integrally formed thereto and extending outwardly in a plane perpendicular to said sidewalls, said first capstan bearing being supported by said support wall in said opening thereof, a support plate having an opening therein aligned with said opening in said cartridge support member and adapted to receive said second capstan bearing, said cartridge support member and said support plate being mounted together by connection of said support plate to said flange portions of said first and second sidewalls, said second capstan bearing being supported by said support plate in said opening thereof, said support plate being precisely positioned with respect to said cartridge support member to thereby accurately align said first and second capstan bearings, and said capstan shaft being supported by said bearings, whereby said capstan shaft is held in a predetermined location with respect to the cartridge receiving chamber.

2. The capstan housing assembly of claim 1 wherein each of said cartridge support member and said support plate are formed of sheet metal.

3. The capstan housing assembly of claim 1 wherein said second sidewall further includes guides thereon to facilitate insertion of the exchangeable cartridge into said cartridge receiving chamber in operative position with respect to said capstan shaft.

4. The capstan housing assembly of claim 1 wherein said first sidewall includes an opening therein, and including retention means positioned in said opening to engage and hold the exchangeable cartridge in playing position with respect to said capstan shaft.

5. The capstan housing assembly of claim 1 further including a flywheel rotatably mounted on said capstan shaft below said cartridge support member.

6. The capstan housing assembly of claim 1 further including a stripper assembly, and mounting means for said stripper assembly for supporting the same on said support plate.

* * * * *

UNITED STATES PATENT AND TRADEMARK OFFICE

CERTIFICATE OF CORRECTION

PATENT NO. : 3,921,881

DATED : November 25, 1975

INVENTOR(S) : Donald J. Dattilo

It is certified that error appears in the above-identified patent and that said Letters Patent are hereby corrected as shown below:

Col. 4, line 8, after "and", first occurrence, delete "a".

Signed and Sealed this

*sixth* Day of *April 1976*

[SEAL]

*Attest:*

RUTH C. MASON
*Attesting Officer*

C. MARSHALL DANN
*Commissioner of Patents and Trademarks*